(12) United States Patent
Sareen et al.

(10) Patent No.: US 8,180,790 B2
(45) Date of Patent: *May 15, 2012

(54) SEARCH MACRO SUGGESTIONS RELEVANT TO SEARCH QUERIES

(75) Inventors: Gaurav Sareen, Bellevue, WA (US); Raghavendra Vinayak Prabhu, Sunnyvale, CA (US); Yofay Kari Lee, Austin, TX (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/716,871

(22) Filed: Mar. 3, 2010

(65) Prior Publication Data

US 2010/0161583 A1  Jun. 24, 2010

Related U.S. Application Data

(63) Continuation of application No. 11/695,473, filed on Apr. 2, 2007, now Pat. No. 7,698,344.

(51) Int. Cl.
*G06F 7/00* (2006.01)
*G06F 17/30* (2006.01)
(52) U.S. Cl. ........................ 707/767; 707/706
(58) Field of Classification Search ......................... None
See application file for complete search history.

(56) References Cited

U.S. PATENT DOCUMENTS

| 2003/0115187 | A1* | 6/2003 | Bode et al. ............. 707/999.003 |
| 2006/0230035 | A1 | 10/2006 | Bailey et al. |
| 2007/0033179 | A1* | 2/2007 | Tenembaum et al. .. 707/999.004 |
| 2007/0050351 | A1* | 3/2007 | Kasperski et al. ..... 707/999.004 |
| 2008/0086443 | A1* | 4/2008 | Prabhu ................... 707/999.001 |
| 2008/0235206 | A1* | 9/2008 | Kurien et al. ........... 707/999.005 |

FOREIGN PATENT DOCUMENTS

| EP | 1574974 A2 | 9/2005 |
| EP | 1587011 A1 | 10/2005 |

OTHER PUBLICATIONS

Supplementary European Search Report Application No. EP 08 72 9771, mailedDec. 29, 2010.

* cited by examiner

*Primary Examiner* — Sathyanarayan Pannala
(74) *Attorney, Agent, or Firm* — Shook Hardy & Bacon LLP

(57) ABSTRACT

Search macros suggestions are provided to refine a user's search. When a search query is received from an end user, one or more search macros are determined to be relevant to the search query. The search macros are then provided to the end user as suggestions for refining the user's search. In some instances, the end user may chose to select one of the suggested search macros. A search is then performed using the search query and the selected search macro to provide search results to the end user that may be more relevant to the user's search.

20 Claims, 7 Drawing Sheets

US 8,180,790 B2

SEARCH MACRO SUGGESTIONS RELEVANT TO SEARCH QUERIES

CROSS-REFERENCE TO RELATED APPLICATIONS

This application is a continuation of U.S. patent application Ser. No. 11/695,473, filed Apr. 2, 2007, the entire disclosure of which is hereby incorporated by reference.

BACKGROUND

A search engine is a program designed to find information stored on one or more computing devices. In its most recognized format, search engines, such as those employed by MSN, Yahoo, and Google, for example, are used to find websites and documents throughout the Internet. These types of search engines typically perform "horizontal" searches, providing a breadth of information related to the search query. However, users often desire information within a narrow topic or field, such that search results from a horizontal search may not be sufficiently relevant to the users. Accordingly, vertical search engines have been designed to perform specialized searches to mine data for a narrower niche than can be provided by a horizontal search. For example, a shopping vertical search engine may be employed to search information for products users may wish to purchase. Other types of search verticals include image verticals, job/career verticals, travel verticals, local services verticals, research verticals, real estates verticals, automobile verticals, and news verticals, for example.

Typically, users turn to commercially-available vertical search engines to perform vertical searches. However, users may be dissatisfied with the choice of available vertical search engines. For example, there may not be a commercially-available vertical search engine directed to the specific topic with which users wish to search or the vertical search engines that are available may not be sufficiently tailored for users' purposes. In such cases, users may wish to create their own search verticals or may wish to find search verticals created and shared by other end users.

BRIEF SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments relate to suggesting search macros (i.e., user-defined search operators for providing a custom-built search engine) to refine a user's search. When a search engine receives a search query from an end user, one or more search macros are determined to be relevant to the search query. The search macros are then provided to the end user as suggestions for refining the user's search. In some instances, the end user may chose to select one of the suggested search macros. A search is then performed using the search query and the selected search macro to provide search results to the end user that may be more relevant to the user's search.

BRIEF DESCRIPTION OF THE SEVERAL VIEWS OF THE DRAWING

The present invention is described in detail below with reference to the attached drawing figures, wherein.

DETAILED DESCRIPTION

Figure 1:
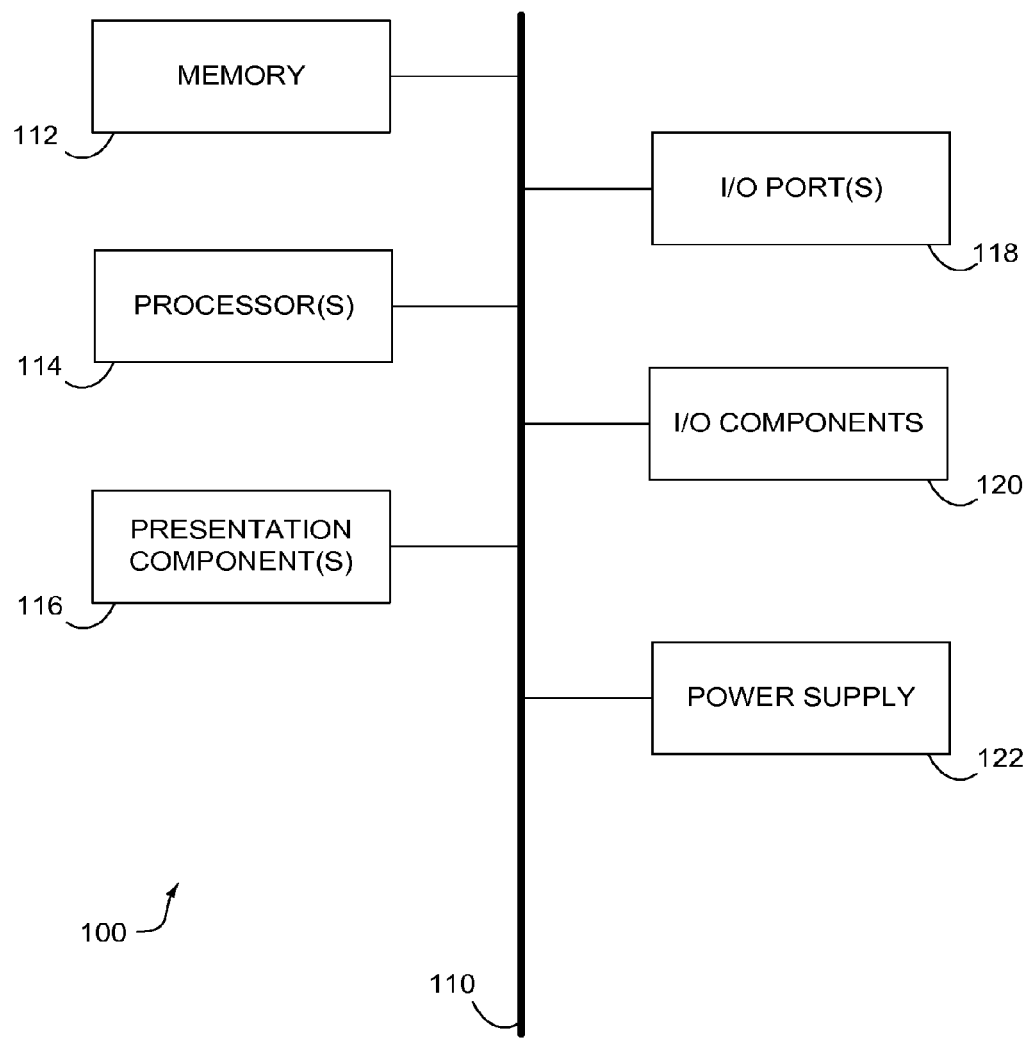
FIG. 1 is a block diagram of an exemplary computing environment suitable for use in implementing the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As indicated previously, users often wish to refine their searches to obtain more relevant search results. One way in which users may refine their searches is through the use of search macros. As used herein, the term "search macro" refers generally to a user-defined search engine. More particularly, a search macro is an advanced search modifier comprising a custom, user-created group of search operators. In other words, a search macro defines search operators that control aspects regarding how a search is performed. For instance, search operators may be used to restrict searches and results to particular websites and/or particular types of content (e.g., image content or real-time news content), provide additional search terms to use in conjunction with terms provided in a user's search query, or give varying preference to different search operators. In operation, a search macro modifies various rules of a more generic search engine in accordance with the user-defined group of search operators, thereby augmenting how the search is performed and/or how the search results are presented.

Search macros provide a simple approach for users to create and share personalized search verticals. Instead of having to build a search vertical from top to bottom, a user may simply create a search macro that defines the relevant aspects of a personalized search vertical. In some instances, a template approach may be provided for search macro creation in which search engine features (e.g., search operators) are modularized and exposed to allow users to define those features. Additionally, when users create search macros, the search macros may be stored, for instance, on a search engine server, such that the search macros are accessible to other users.

Although search macros provide a simple and powerful tool for users to refine their searches, users may not wish to create their own search macros. Instead, they may simply want to take advantage of search macros created by other users. However, it may be difficult for users to find a relevant search macro for their searches. Typically, search macros may be stored in a search macro gallery, and a user may discover existing search macros by browsing and/or searching the gallery or by word of mouth from other users. However, when most users are performing searches, they typically do not want to spend time searching for a relevant search macro. Instead, users want to quickly provide a search query and receive relevant search results.

Embodiments of the present invention are directed to, among other things, facilitating users' discovery of search macros and providing suggested search macros to refine their searches in an attempt to obtain more relevant search results. In particular, embodiments are directed to providing users with search macro suggestions determined to be relevant to their search queries. When a user enters a search query, one or more search macros are determined to be relevant to the search query and are provided as suggestions to the user. The user may select a search macro, and a search is performed using the search query and the selected search macro.

Accordingly, in one aspect, an embodiment of the invention is directed to one or more computer-readable media embodying computer-useable instructions for performing a method. The method includes receiving a search query from an end user at a search engine. The method also includes determining one or more search macros relevant to the search query. The method further includes communicating at least a portion of the search macros for presentation to the end user.

In another embodiment of the invention, an aspect is directed to one or more computer-readable media embodying computer-useable instructions for performing a method. The method includes performing a search using a search macro and receiving one or more search results from the search. The method also includes identifying one or more terms or URLs in at least a portion of the search results and calculating scores for terms or URLs for the search macro. The method further includes storing information indicative of the terms or URLs, the search macro, and the scores.

A further aspect of the invention is directed to one or more computer-readable media embodying a data structure for facilitating the identification of one or more search macros relevant to a search query. The data structure includes a first data field containing data representing a term or a URL; a second data field containing data representing a search macro; and a third data field containing data representing a score associated with the search macro and the term or the URL.

Having briefly described an overview of the present invention, an exemplary operating environment in which various aspects of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, or any other storage medium that can be used to encode and store desired information and be accessed by computing device 100.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
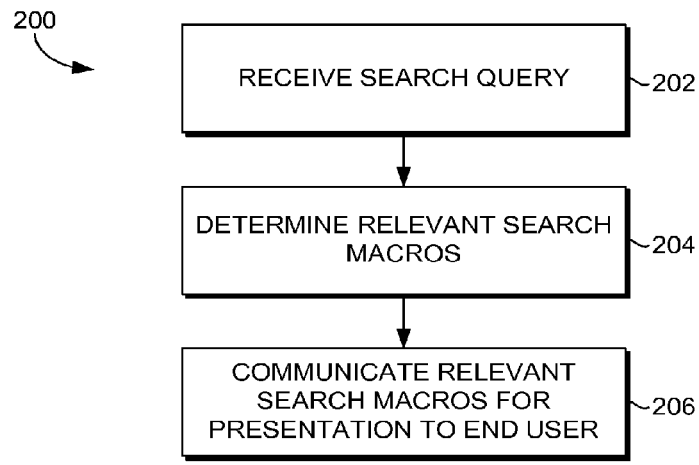
FIG. 2 is a flow diagram showing an exemplary overall method for providing search macros relevant to a given search query in accordance with an embodiment of the present invention.

Referring now to FIG. 2, a flow diagram is provided illustrating an exemplary overall method 200 for providing search macro suggestions relevant to a given search query in accordance with an embodiment of the present invention. The method 200 described with reference to FIG. 2 provides an overall view of an embodiment of the present invention, while more detailed descriptions of various embodiments of the invention are provided in the following sections. Initially, as shown at block 202, a search query is received at a search engine. As one skilled in the art will recognize, the search query may comprise one or more search terms entered by an end user. Additionally, the search query may be received at the search engine in a number of different ways. By way of example only and not limitation, a user may employ a web browser to navigate to a search engine web page and enter the search query in an input box on the web page. Additionally, a user may enter the search query in an input box provided by a search engine toolbar located, for instance, within a web browser, the desktop of the user's computing device, or other location. One skilled in the art will recognize that a variety of other approaches may also be employed to allow an end user to provide a search query to a search engine.

After receiving the search query, the search engine determines search macros relevant to the search query, as shown at block 204. As will be described in further detail below, search macros relevant for a given search query may be determined in a variety of different manners within the scope of the present invention. By way of example only and not limitation, search macros may be determined based on the terms included in the search query. In some embodiments, relevant search macros may be determined based on the search results for the search query. For instance, terms from a search query and/or search results for the search query may be compared against information associated with search macros to determine which search macros are relevant. The information associated with search macros may include, for instance, the search operators of the search macro and/or search results provided when a search is performed using each search macro. In some embodiments, keywords suggested by macro authors may be used to select search macros. For instance, search terms and/or search results may be compared against keywords associated with search macros to determine relevant search macros. In still further embodiments, relevant search macros for a given search query may be cached from a previous search, and determination of search macros for the query may comprise accessing the cached information. Any and all such variations are contemplated to be within the scope of embodiments of the present invention.

As shown at block 206, after determining relevant search macros for the search query, at least a portion of the relevant search macros are communicated for presentation to the end user. Although not required, a search results user interface (such as those typically provided by search engines when performing searches) may be provided that lists the relevant search macros for the search query. In some embodiments, the relevant search macros are provided in addition to search results for the search query. In further embodiments, further searches may also be automatically performed using highly relevant search macros and the user's search query. The search results for each of these search macros may then be directly included inline with the relevant search macros in addition to the search results for the user's search query (i.e., without any search macro applied).

In embodiments, the relevant search macros may be ordered in the list based on rankings determined for the relevant search macros. The rankings may be based, for example, on the degree of relevance to the search query for each of the search macros. In some embodiments, all search macros determined to have a minimum level of relevance to the search query are provided to the end user. In other embodiments, only the N most relevant search macros are provided to the end user (e.g., the five most relevant search macros). In further embodiments, if one or more search macros are determined to have a significantly higher relevance than other search macros, only those search macros with the significantly higher relevance are provided to the end user. Any and all such variations are contemplated to be within the scope of embodiments of the present invention.

Each relevant search macro provided, for example, via a search results user interface may comprise a hyperlink or other mechanism allowing for the user selection of a relevant search macro. Accordingly, when a user selects a particular search macro, a search is performed using the selected search macro and the original search query provided by the end user. The search results for the search query using the selected search macro may then be provided to the end user. In some cases, instead of performing a search with the original search query, the user may replace the original search query with a new search query (e.g., by entering the new search query in an input box) and select one of the previously returned search macros to perform a search.

Figure 3:
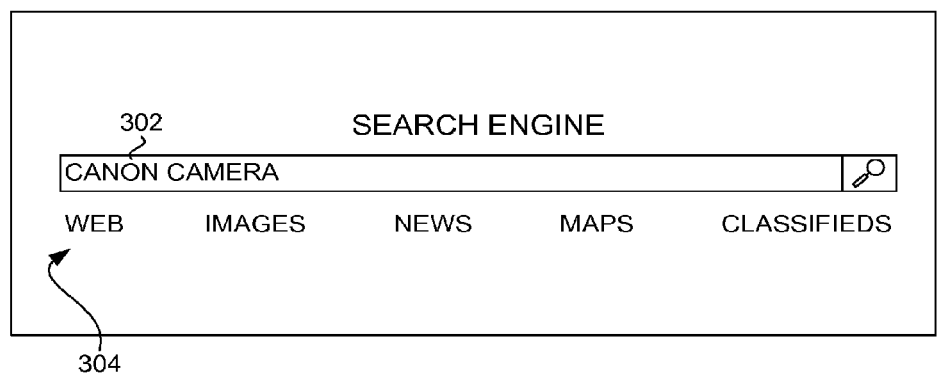
FIG. 3 is an illustrative screen display showing a search input box for a search engine in accordance with an embodiment of the present invention.

By way of illustration, FIG. 3 illustrates a search input box 302 that may be provided, for instance, via a search engine web page. The search input box 302 allows a user to enter a search query for search purposes. As known in the art and shown in FIG. 3, a search engine may provide a variety of searching capabilities, including a broad web search and a variety of vertical searches. Accordingly, a number of search selections 304 are provided in conjunction with the search input box 302. By inputting a search query in the search input box 302 and selecting one of the search selections 304, a user may cause the search engine to perform the selected type of search using the inputted search query.

Figure 4:
FIG. 4 is an illustrative screen display showing a search results user interface including suggested search macros for a given search query in accordance with an embodiment of the present invention.

In the illustrated example, the user has entered the search query {canon camera} in the search input box 302. After entering the search query, the search engine performs a search using the search query. Additionally, the search engine determines that a number of search macros are relevant to the search query. Accordingly, the search engine provides a search results user interface 400 shown in FIG. 4. The search results user interface 400 includes a list of search results 404, each search result including a title 406, a snippet description 408, and a URL 410. Additionally, the search results user interface 400 includes a list of suggested search macros 402 determined to be relevant for the search query. In the illustrated example of FIG. 4, the search engine has determined that a macros titled "Product Review" and "Shopping" are relevant to the search query {canon camera}. As indicated previously, each search macro may be presented in hyperlink form allowing the user to interact with the search macros, for instance, by selecting a particular search macro and causing a web search to be performed using the search query {canon camera} and the selected search macro.

As previously mentioned, in some embodiments, relevant search macros may be determined based on a search query alone. For instance, terms in the search query may be compared against information associated with search macros, such as keywords associated with search macros, the search operators of search macros, and/or search results provided when a search is performed using each search macro. However, the terms included in a particular search query may not provide enough information to determine highly relevant search macros for the end user. Accordingly, in some embodiments, search results for a given search query may be used to determine relevant search macros in lieu of or in addition to the terms of the search query. For instance, search results for a search query may be compared against information associated with search macros, such as, keywords associated with search macros, the search operators of search macros, and/or search results provided when a search is performed using each search macro.

Figure 5:
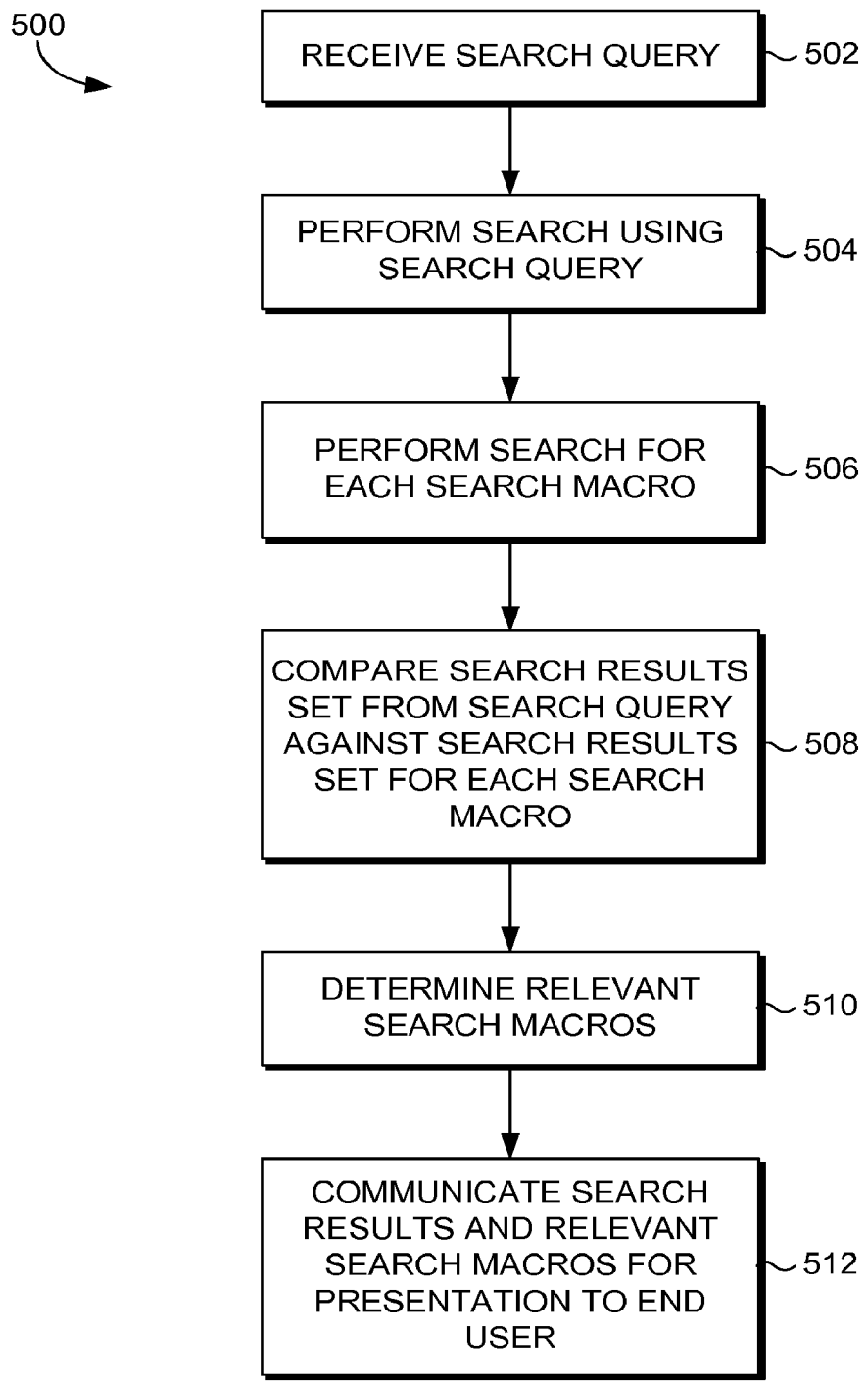
FIG. 5 is a flow diagram showing an exemplary method for using search results for a search query to determine relevant search macros in accordance with an embodiment of the present invention.

Referring to FIG. 5, a flow diagram is provided that illustrates an overall method 500 for using search results to determine relevant search macros in accordance with an embodiment of the present invention. As shown at block 502 in FIG. 5, a search query from an end user is received at a search engine. A search is performed using the search query, as shown at block 504, providing a search results set for the search query. Additionally, a search is performed using each search macro in a set of search macros available to the search engine, as shown at block 506, to provide a search results set for each search macro. Typically, the search is performed using each search macro in isolation. In other words, no additional search terms (e.g., the search query provided at block 502) are used in conjunction with each search macro. Because each search macro comprises a set of search operators, performing a search using a search macro alone will provide a set of search results based on those search operators.

The search results set from the search performed using the search query is compared against the search results sets for the searches performed using the search macros, as shown at block 508. Through this comparison, intersections may be identified between the search query search results and the search macros search results. Search macros providing search results with a higher degree of intersection with the search query search results may be determined to have higher relevance. In some embodiments, the analysis may include comparing terms and/or URLs in the search query results set against the search macro results sets. Terms may be identified from different sources in various embodiments of the invention. For instance, terms may be identified from the title and snippet description associated with each search result and/or portions of URLs included in search results. Additionally or alternatively, terms may be identified from portions of a document corresponding with a search result (e.g., document title, body, anchor text). Further, it should be noted that URLs used in the comparison may comprise just the domain or also the subdomain.

Accordingly, as shown at block 510, relevant search macros are determined based on the comparison. At least a portion of the relevant search macros are then communicated for presentation to the end user, as shown at block 512.

To illustrate the determination of relevant search macros based on result sets for a search query and a set of search macros, suppose, for instance, that the search query includes the terms "canon camera," and there are five search macros in the system: "Health," "Product Reviews," "Shopping," "Celebrity Gossip" and "Technical Publications." Each search macro is essentially a search engine targeted at the domain indicated by its name. Suppose further that a search for the search query {canon camera} and each of the search macros in isolation provides the following results:

{canon camera}: Returns pages from canon.com including product details and support pages, a few camera review sites (like dpreview.com and imagingresource.com), a few shopping sites (amazon.com, bizrate.com) and so on.

{macro:"Health"}: Returns results from sites that provide health and medicine related information, like nih.gov, cdc.gov and cde.ca.gov.

{macro:"Product Reviews"}: Returns results from popular product review sites, like reviews.cnet.com, dpreview.com, dcresource.com and imagingresource.com.

{macro:"Shopping"}: Returns a list of top shopping sites like amazon.com, ebay.com, buy.com and bizrate.com.

{macro:"Celebrity Gossip"}: Returns pages focusing on celebrities and fan sites, like gofugyourself.typepad.com and tmz.com.

{macro:"Technical Publications"}: Returns sites featuring technical papers and research, like dmreview.com, database-journal.com and citeseer.ist.psu.edu.

Comparison of the results set for the search query {canon camera} against the results sets for each of the search macros indicates that the search macros, "Product Review" and "Shopping," include results having the most overlap with the search query's results. Intuitively, those are the search macros most likely to help the user in narrowing down the search based on intent. For another query, such as, for instance, {measles symptoms}, the most overlap would be for the "Health" search macro, so that search macro would be the most relevant one for that particular search query.

In some embodiments, the process of performing searches using each search macro to obtain search macro results sets may be performed after a search query from an end user has been received by the search engine. However, because the searches may be performed using each search macro in isolation (i.e., without additional search terms), the searches may be performed offline before a search query is received, and a data store may be constructed to store information to facilitate the identification of relevant search macros for search queries. Accordingly, in some embodiments, an offline component and an online component may be provided for suggesting search macros for user search queries. The offline component performs searches with each search macro in isolation and indexes information regarding the search macro results in a data store. The online component then receives user search queries and determines relevant search macros by referring to the data store.

Figure 6:
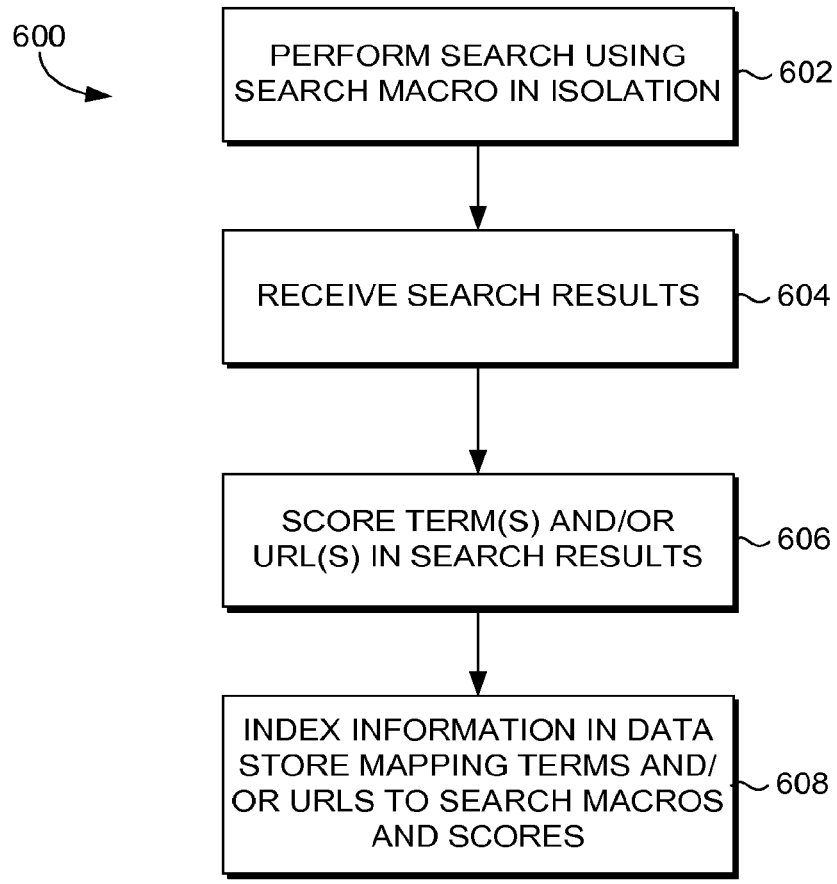
FIG. 6 is a flow diagram showing an exemplary method for performing search macro searches and indexing information for search macros in accordance with an embodiment of the present invention.

Turning now to FIG. 6, a flow diagram is provided illustrating an exemplary method 600 for performing search macro searches and indexing information for search macros in accordance with an embodiment of the present invention. The method 600 may be performed, for instance, by an offline component, and the indexed information may be then used by the online component to determine relevant search macros for user search queries. As indicated previously, a search engine may include a set of search macros. The method 600 includes performing a search using each search macro and generating scores based on search results set for each search macro.

As shown at block 602, a search is performed using each search macro in isolation. In other words, a search is performed using the search operators defined by each search macro without any additional search terms. Search results for each search macro in the set are received from the searches, as shown at block 604. The search results sets for the search macros are then analyzed to determined scores for each search macro for various terms and/or URLs identified within the search results sets, as shown at block 606. In some embodiments, all search results for a given search macro are analyzed, while in other embodiments, only the top N results for a search macro are used (e.g., only the top 500 results).

In some embodiments, terms may be identified within a search macro's results set and a score may be determined for the search macro for each term. Terms may be identified from different sources in various embodiments of the invention. For instance, terms may be identified within the URL or from the snippet description associated with each search result. Additionally or alternatively, terms may be identified from portions of a document corresponding with a search result (e.g., document title, body, anchor text).

Scores for the search macro for each term may also be determined in a variety of different manners within the scope of embodiments of the present invention. In some embodiments, for instance, stemming functionality may be provided for standardizing words to their respective root words. Additionally, stop-word filtering may be provided to identify and filter out stop words (i.e., words that are unimportant to the content of the web page). Low-usage word removal may also be provided for removing words that appear less frequently than a certain pre-defined threshold. The score for a search macro M for a term T may be computed as follows:

(Frequency of term T in macro M's result set)/(Total frequency of term T across result sets for all macros)

In some embodiments, scores may be determined for the search macro for URLs included in the search macro's result set. URL scores for each search macro may be determined based on a number of factors. In some embodiments, the score for a given search macro and URL may be based on the ranking of the URL within the search macro's results set. For instance, the higher the ranking within the results set, the higher the score for the search macro for that URL. In some embodiments, the score for a given search macro and URL may take into account the number of results within a domain corresponding with the URL. For instance, more URLs from a particular domain within the search macro's results set may indicate that a higher score should be given to the search macro for each of those URLs within the domain.

Information regarding the macro scores is indexed, as shown at block 608. In particular, the index may include a list of terms and/or URLs that were identified in the search results sets for the search macros within the set. For each term or URL, a list of search macros and a score for each search macro for that term or URL is provided. In some embodiments, only the top matching search macros and corresponding score are provided for each term and URL. Additionally, in some embodiments, the data store may comprise a trie data structure for efficient lookup.

Figure 7:
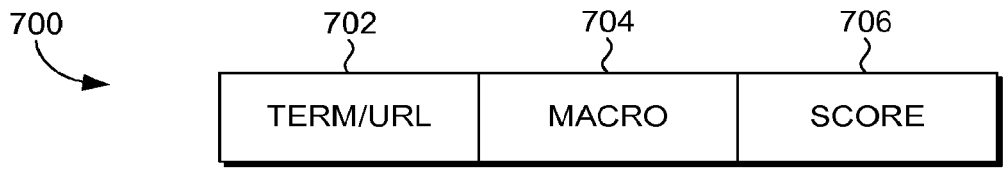
FIG. 7 is an exemplary data structure for a indexing a macro score for term(s) and/or URL(s) in accordance with an embodiment of the present invention.

An exemplary data structure 700 for storing macro scores for terms and/or URLs in accordance with an embodiment of the present invention is illustrated in FIG. 7. The data structure 700 includes a first data field 702 containing data representing a term or a URL. In particular, this is a term or a URL identified within a search results set for a search macro. The data structure 700 also includes a second data field 704 containing data representing a given search macro. For instance, a unique identifier for a search macro may be included in the second data field 704. The data structure 700 further includes a third data field 706 containing a score for the term or URL indicated in the first data field and the search macro indicated in the second data field 704. As discussed above, the score may be determined by examining the search results set provided by a search using the search macro in isolation.

Figure 8:
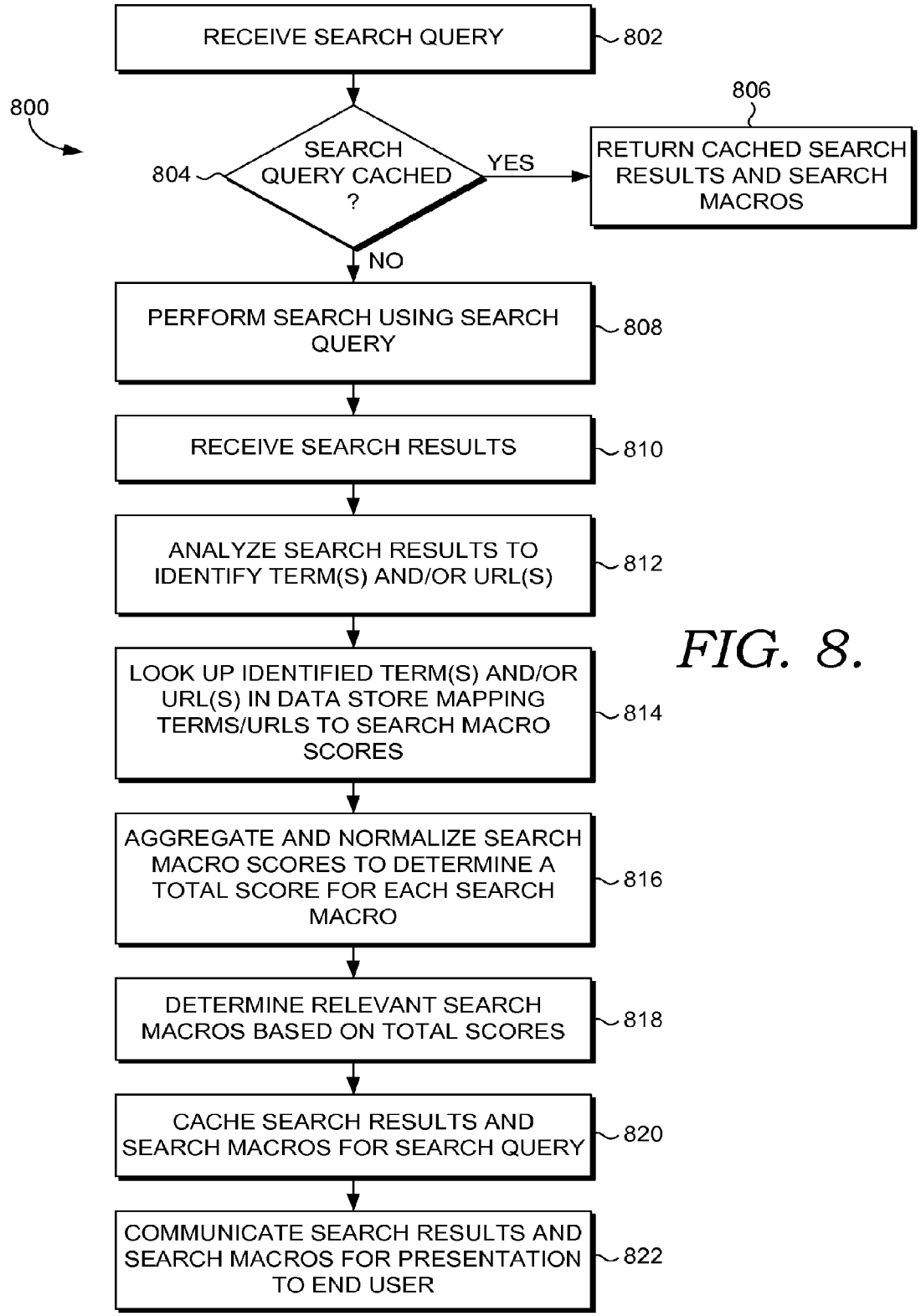
FIG. 8 is a flow diagram showing an exemplary method for providing relevant search macros for a given search query using a cache and a data store created offline in accordance with an embodiment of the present invention.

Using a data store indexing terms/URLs and search macro scores may facilitate the identification of relevant search macros for search queries. Additionally, in some embodiments, when relevant search macros for given search queries are determined, information may be cached for further searches. Accordingly, referring now to FIG. 8, a flow diagram is provided showing an exemplary method 800 for providing relevant search macros for a given search query using a cache and a data store created offline in accordance with an embodiment of the present invention. Initially, as shown at block 802, a search query from an end user is received at a search engine. Whether search results and relevant search macros for the search query has been cached is determined at block 804. If a search has previously been performed using the search query and information has been cached, the cached search results and relevant search queries are returned, as shown at block 806.

If, at block 804, it is determined that information has not be cached for the search query, a search is performed using the terms of the search query, as shown at block 808. Search results are then received, as shown at block 810. The search results are analyzed to identify terms and/or URLs for determining relevant search macros, as shown at block 812. In some embodiments, all search results are analyzed, while in other embodiments, only the top N scoring search results are analyzed. Identification of relevant terms and URLs may be identified similar to the identification of terms and URLs within search macro results sets described hereinabove.

The identified terms and URLs from the search query results set are looked up in a data store mapping terms/URLs to search macro scores to identify the search macro scores for each term and URL, as shown at block 814. The search macro scores are then aggregated and normalized to get a total score for each search macro, as shown at block 816. Relevant search macros are then determined at block 818 based on the total scores for each search macro. In some embodiments, all search macros determined to have a predetermined minimum score to the search query are determined to be relevant. In other embodiments, only a predetermined number of search macros with the highest scores are determined to be relevant. In further embodiments, if one or more search macros have a score that is significantly higher than the other search macros, only those search macros with the significantly higher score are determined to be relevant. Any and all such variations are contemplated to be within the scope of embodiments of the present invention.

As shown at block 820, the search results and the relevant search macros for the search query are cached. The search results and the relevant search macros are then communicated for presentation to the end user, as shown at block 822. In embodiments, the relevant search macros may be ordered based on the total scores determined for each relevant search macro.

Figure 9:
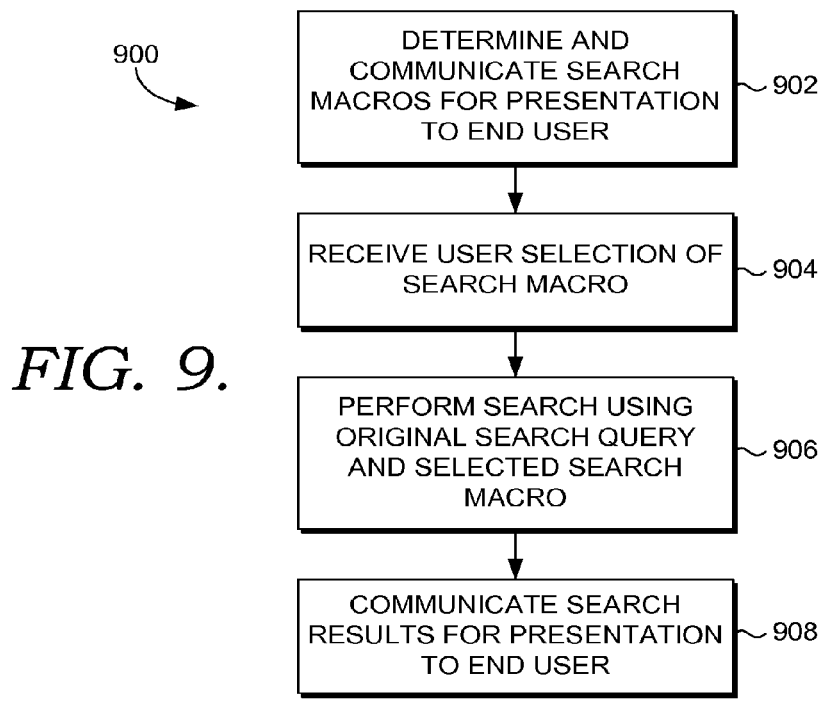
FIG. 9 is a flow diagram showing an exemplary method for performing a search using a given search query and a suggested search macro in accordance with an embodiment of the present invention.

As indicated previously, suggested search macros may be employed by an end user to refine a search. For instance, FIG. 9 provides a flow diagram showing an exemplary method 900 for performing a search using a given search query and a suggested search macro in accordance with an embodiment of the present invention. Initially, as shown at block 902, relevant search macros for a given search query are determined and communicated for presentation to an end user, such as described hereinabove. Each of the search macros may be presented to the user in hyperlink form or may otherwise allow for selection of the search macros. As shown at block 904, a user selection of one of the search macros is received (e.g., by a user employing a pointing device, such as a mouse, to click on a hyperlink associated with the search macro). Based on the user selection, a search is performed using the search query and the selected search macro, as shown at block 906. In particular, a search is performed based on the search operators defined by the search macro in conjunction with the terms of the search query. In some embodiments, instead of searching with the original search query, the user may chose to enter a different search query, and the search is performed with the new search query and the selected search macro. In any case, search results are communicated for presentation to the end user, as shown at block 908.

Figure 10:
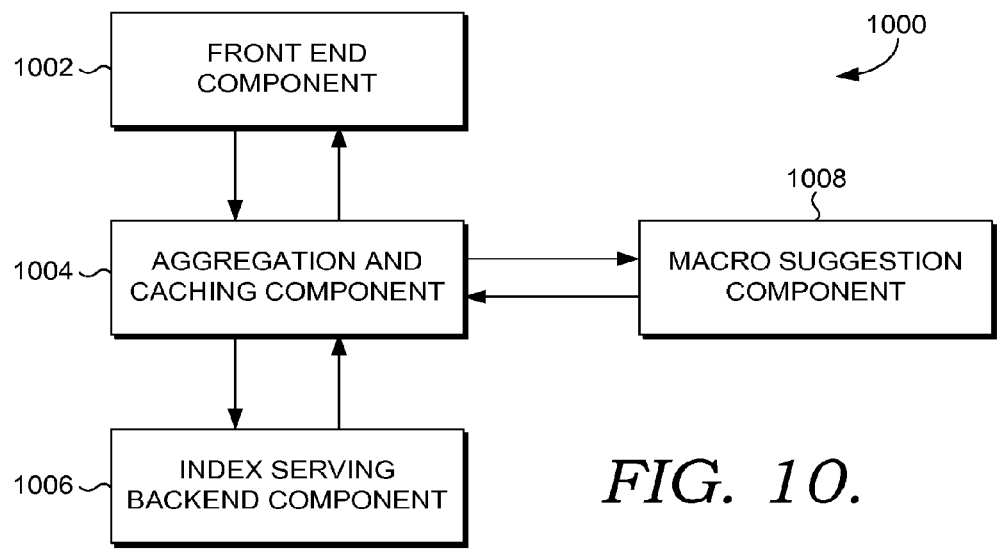
FIG. 10 is a block diagram showing an online search macro suggestion system in accordance with an embodiment of the present invention.

Referring now to FIG. 10, a block diagram is provided illustrating an exemplary system 1000 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

FIG. 10 illustrates an illustrative online macro suggestion system for returning relevant search macros for a given search query by utilizing a data store created by an offline macro scoring system. Among other components not shown, the system 1000 may include a front-end component 1002, an aggregation and caching component 1004, an index serving backend component 1006, and a macro suggestion component 1008. Each of the components shown in FIG. 10 may comprise software, hardware, or a combination of software and hardware. In various embodiments, each of the components may comprise software located on a common computing device or on different computing devices in a distributed environment. In a distributed environment, the components may communicate with each other via a network (not shown), which may include, without limitation, one or more local area networks (LANs) and/or wide area networks (WANs). Such networking environments are commonplace in offices, enterprise-wide computer networks, intranets, and the Internet. It should be understood that the functionality described herein for each component shown in FIG. 10, may be provided by one or more components. Additionally, other components not shown may also be included within the system 1000.

In operation, the frontend component 1002 receives a search query from an end user and issues a request to the aggregation and caching component 1004. The aggregation and caching component 1004 looks up the search query in its cache to determine whether search results and search macro suggestions are available for the search query. If cached, the search results and search macro suggestions for the search query are returned to the frontend component 1002, which communicates the search results and search macro suggestions for presentation to the end user.

If search results and search macro suggestions are not cached, the aggregation and caching component 1004 issues a request to the index serving backed 1006, which performs a search using the terms of the search query and returns search results to the aggregation and caching component 1004. The search results (or portions thereof) are sent to the macro suggestion component 1008, which performs a lookup in a data store created by an offline macro scoring system and scores various search macros based on the lookup. The macro suggestion component 1008 then returns a set of search macro suggestions (if any) that are relevant to the search query based on the scores.

The aggregation and caching component 1004 receives and caches the set of search macro suggestions (along with the search results) and forwards the search results set and the search macro suggestions to the frontend component 1002. The frontend component 1002 then communicates the search results and search macro suggestions for presentation to the end user.

As can be understood, embodiments of the present invention provide search macro suggestions for a given query search. The search macro suggestions are determined based on relevance to the query search and may assist a user in refining their search and finding relevant search results.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. A computer-readable storage medium storing computer-useable instructions that, when used by a search engine device having a processor, cause the search engine device to perform a method, comprising:

performing a search using a pre-existing and user-defined first search macro at the search engine device;

receiving one or more search results from the search;

identifying one or more terms or URLs in at least a portion of the one or more search results;

calculating scores for the one or more terms or URLs for the first search macro; and storing information indicative of the one or more terms or URLs, the first search macro, and the scores;

receiving a search query from an end user at the search engine device;

determining one or more pre-existing and user-defined search macros relevant to the search query, the one or more search macros including the first search macro; and communicating an identification of the one or more search macros for presentation to the end user.

2. The computer-readable storage medium of claim 1, wherein the search query comprises one or more search terms.

3. The computer-readable storage medium of claim 2, wherein determining the one or more search macros relevant to the search query comprises determining the one or more search macros based on the search terms of the search query.

4. The computer-readable storage medium of claim 1, further comprising determining one or more search results based on the search query.

5. The computer-readable storage medium of claim 4, further comprising communicating at least a portion of the one or more search results based on the search query for presentation to the end user.

6. The computer-readable storage medium of claim 4, wherein determining the one or more search macros relevant to the search query comprises determining the one or more search macros based on at least a portion of the one or more search results based on the search query.

7. The computer-readable storage medium of claim 1, further comprising:
   receiving a user selection of at least one search macro;
   performing a search using the search query and the at least one search macro to generate search results; and
   communicating the search results for presentation to the end user.

8. A computer-readable storage medium storing computer-useable instructions that, when used by a search engine device having a processor, cause the search engine device to perform a method, comprising:
   performing a search using a pre-existing and user-defined search macro at the search engine device;
   receiving one or more search results from the search;
   identifying one or more terms or URLs in at least a portion of the one or more search results;
   calculating scores for the one or more terms or URLs for the search macro; and
   storing information indicative of the one or more terms or URLs, the search macro, and the scores.

9. The computer-readable storage medium of claim 8, wherein performing the search using the search macro comprises performing the search using the search macro in isolation.

10. The computer-readable storage medium of claim 8, wherein calculating a score for each term or URL is based on a frequency of the term or URL in the at least a portion of the one or more search results for the search macro compared against a frequency of the term or URL in at least a portion of search results for one or more other search macros.

11. The computer-readable storage medium of claim 8, further comprising:
   receiving a search query from an end user;
   determining that the search macro is relevant to the search query based on the information stored for the search macro.

12. The computer-readable storage medium of claim 11, further comprising communicating an identification of the search macro for presentation to the end user.

13. The computer-readable storage medium of claim 12, wherein the identification of the search macro is communicated on a search results page with a plurality of search results for the search query.

14. The computer-readable storage medium of claim 12, further comprising:
   receiving a user selection the search macro;
   performing a search using the search query and the at least one search macro; and
   communicating search results for presentation to the end user.

15. A method performed by a search engine device for providing one or more search macros relevant to a search query, the method comprising:
   receiving a search query from an end user device at the search engine device;
   accessing, at the search engine device, information regarding a plurality of pre-existing and user-defined search macros available to the search engine device, the plurality of search macros having been previously defined by a plurality of different end users, each search macro comprising a set of user-defined search operators that operate to modify aspects of how searches are performed by the search engine device;
   determining, at the search engine device, one or more search macros relevant to the search query from the plurality of search macros; and
   communicating an identification of the one or more search macros from the search engine device to the end user device, wherein the identification of the one or more search macros is presented by the end user device.

16. The method of claim 15, wherein the search query comprises one or more search terms, and wherein determining the one or more search macros relevant to the search query comprises determining the one or more search macros based on the search terms of the search query.

17. The method of claim 15, wherein the method further comprises determining one or more search results based on the search query.

18. The method of claim 17, wherein the method further comprises communicating at least a portion of the one or more search results for presentation to the end user.

19. The method of claim 18, wherein determining the one or more search macros relevant to the search query comprises determining the one or more search macros based on at least a portion of the search results.

20. The method of claim 18, wherein the method further comprises:
   receiving a user selection of at least one search macro;
   performing a search using the search query and the at least one search macro to generate search results; and
   communicating the search results for presentation to the end user.

* * * * *